(12) United States Patent
Sahashi

(10) Patent No.: US 7,794,021 B2
(45) Date of Patent: Sep. 14, 2010

(54) CUSHION SPRING RETAINING STRUCTURE

(75) Inventor: Hideo Sahashi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 3 days.

(21) Appl. No.: 12/254,239

(22) Filed: Oct. 20, 2008

(65) Prior Publication Data

US 2009/0152931 A1    Jun. 18, 2009

(30) Foreign Application Priority Data

Dec. 14, 2007    (JP)    ............... 2007-323288

(51) Int. Cl.
*A47C 7/02* (2006.01)
(52) U.S. Cl. ............. 297/452.52; 297/452.53; 297/452.54; 297/452.49
(58) Field of Classification Search ............ 297/452.54, 297/452.52, 452.53, 452.49; 403/315, 316; 5/189, 263; 248/220.21, 220.22, 224.7
See application file for complete search history.

(56) References Cited

U.S. PATENT DOCUMENTS

| | | | | |
|---|---|---|---|---|
| 2,695,658 A | * | 11/1954 | Flint | ............... 403/208 |
| 3,649,077 A | * | 3/1972 | Flint | ............... 297/452.52 |
| 3,992,853 A | * | 11/1976 | Morris | ............... 24/598.1 |
| 4,157,173 A | * | 6/1979 | Crosby | ............... 267/110 |
| 4,181,835 A | | 1/1980 | Stadler et al. | |
| 4,213,021 A | | 7/1980 | Alexander | |
| 4,357,005 A | * | 11/1982 | Bourke | ............... 267/144 |
| 4,415,147 A | | 11/1983 | Biscoe et al. | |
| 4,435,626 A | | 3/1984 | Coffin | |
| 4,500,759 A | | 2/1985 | deFasselle et al. | |
| 4,513,184 A | | 4/1985 | Hughes | |
| 4,586,700 A | * | 5/1986 | Crosby | ............... 267/105 |
| 4,709,906 A | * | 12/1987 | Mizelle | ............... 267/103 |
| 4,739,135 A | | 4/1988 | Custer | |
| 4,763,114 A | | 8/1988 | Eidsmore | |
| 4,823,838 A | | 4/1989 | Ferlin | |
| 4,930,488 A | | 6/1990 | Pearman et al. | |
| 4,996,396 A | | 2/1991 | Smith | |
| 5,018,964 A | | 5/1991 | Shah | |
| 5,019,678 A | | 5/1991 | Templeton et al. | |
| 5,070,220 A | | 12/1991 | Glenn | |

(Continued)

FOREIGN PATENT DOCUMENTS

ES    2296428 A1    4/2008

(Continued)

OTHER PUBLICATIONS

English language Abstract of JP 2001-120383 A.

(Continued)

*Primary Examiner*—David Dunn
*Assistant Examiner*—Erika Garrett
(74) *Attorney, Agent, or Firm*—Greenblum & Bernstein, P.L.C.

(57) ABSTRACT

The present invention can include a seat frame including a claw member, a spring member having a first end and a second end both connected to the frame, wherein the first end is retainable in the claw member, also the first end includes a first and second support member positioned on either side of the claw member, the first and second support member having a height that is equal to or greater than a height of the claw member.

11 Claims, 4 Drawing Sheets

U.S. PATENT DOCUMENTS

| | | | |
|---|---|---|---|
| 5,333,596 A | 8/1994 | Clifford | |
| 5,363,522 A * | 11/1994 | McGraw | 5/17 |
| 5,409,198 A * | 4/1995 | Roick | 267/107 |
| 5,416,294 A | 5/1995 | Glenn | |
| 5,505,436 A * | 4/1996 | Roick | 267/107 |
| 5,608,383 A | 3/1997 | Neil | |
| 5,617,840 A | 4/1997 | Clifford | |
| 5,628,242 A | 5/1997 | Higley | |
| 5,707,046 A * | 1/1998 | Tillner | 267/80 |
| 5,813,394 A | 9/1998 | Clifford | |
| 6,116,694 A * | 9/2000 | Bullard | 297/452.52 |
| 6,155,160 A | 12/2000 | Hochbrueckner | |
| 6,170,915 B1 * | 1/2001 | Weisz | 297/452.5 |
| 6,289,792 B1 | 9/2001 | Grando | |
| 6,472,624 B1 | 10/2002 | Harris et al. | |
| 6,528,748 B2 | 3/2003 | Harris et al. | |
| 6,565,157 B2 * | 5/2003 | Barile et al. | 297/452.52 |
| 6,637,824 B1 * | 10/2003 | Yokota | 297/452.18 |
| 6,684,757 B2 | 2/2004 | Petersen | |
| 6,733,276 B1 | 5/2004 | Kopping | |
| 6,741,179 B2 | 5/2004 | Young | |
| 7,017,254 B2 * | 3/2006 | Guillot | 29/469.5 |
| 7,036,864 B2 * | 5/2006 | Rehfuss et al. | 297/452.52 |
| 7,105,757 B2 | 9/2006 | Valentini | |
| 7,117,893 B1 | 10/2006 | Krupa | |
| 7,226,130 B2 * | 6/2007 | Tubergen et al. | 297/452.52 |
| 2004/0004386 A1 | 1/2004 | Guillot | |

FOREIGN PATENT DOCUMENTS

JP     2001-120383 A     5/2001

OTHER PUBLICATIONS

English language Abstract of ES 2296428 A1.

* cited by examiner

CUSHION SPRING RETAINING STRUCTURE

This application claims priority to Japanese patent application serial number 2007-323288, the contents of which are incorporated herein by reference.

BACKGROUND OF THE INVENTION

1. Field of the Invention

The present invention relates to a retaining structure for a cushion spring in a frame of a vehicle seat.

2. Description of the Related Art

A kind of cushion spring retaining structure, wherein a cushion spring is stretched over a frame of a seat cushion is described in JP-A-2001-120383. This retaining structure includes a hook formed by bending one end of the cushion spring (in a bridging form in a seat width direction), and a claw formed protruding from an upper surface of the frame at a front side. By fixing the other end of the cushion spring to a pipe frame on a frame back side, the cushion spring is stretched over the frame. Further, the claw is a plate member (of an approximate L shape when viewed side on) including an upright segment, standing perpendicular to the upper surface of the frame, and an extended segment at an upper portion thereof extending toward a seat front side.

According to this type of retaining structure, in a stretched condition the cushion spring is maintained by retaining the hook in the L-shaped claw.

However, in this configuration, the claw inevitably protrudes on a padding member side from the cushion spring in the stretched condition. For this reason, the padding member comes into contact with the protruding claw (the extended segment), and is capable of being damaged (a so-called padding cutting occurs).

Naturally, it is feasible to install a supporting stand, of a height dimension exceeding that of the claw, on the frame, to support the padding member with the supporting stand. However, with this more complex configuration the installation is more difficult because the supporting stand need be installed on the frame before a cushion spring retaining operation.

SUMMARY OF THE INVENTION

The present invention can include a seat frame including a claw member, a spring member having a first end and a second end both connected to the frame, wherein the first end is retainable in the claw member, also the first end includes a first and second support member positioned on either side of the claw member, the first and second support member having a height that is equal to or greater than a height of the claw member.

DETAILED DESCRIPTION OF THE INVENTION

Each of the additional features and teachings disclosed above and below may be utilized separately or in conjunction with other features and teachings to provide the cushion spring retaining structure. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Hereafter, a description will be given, referring to FIGS. 1 to 5, of a best mode for carrying out the invention. In each figure, a reference letter F will be given to a front side of a vehicle seat, and a reference letter B to a back side of the vehicle seat.

First Embodiment

Figure 1:
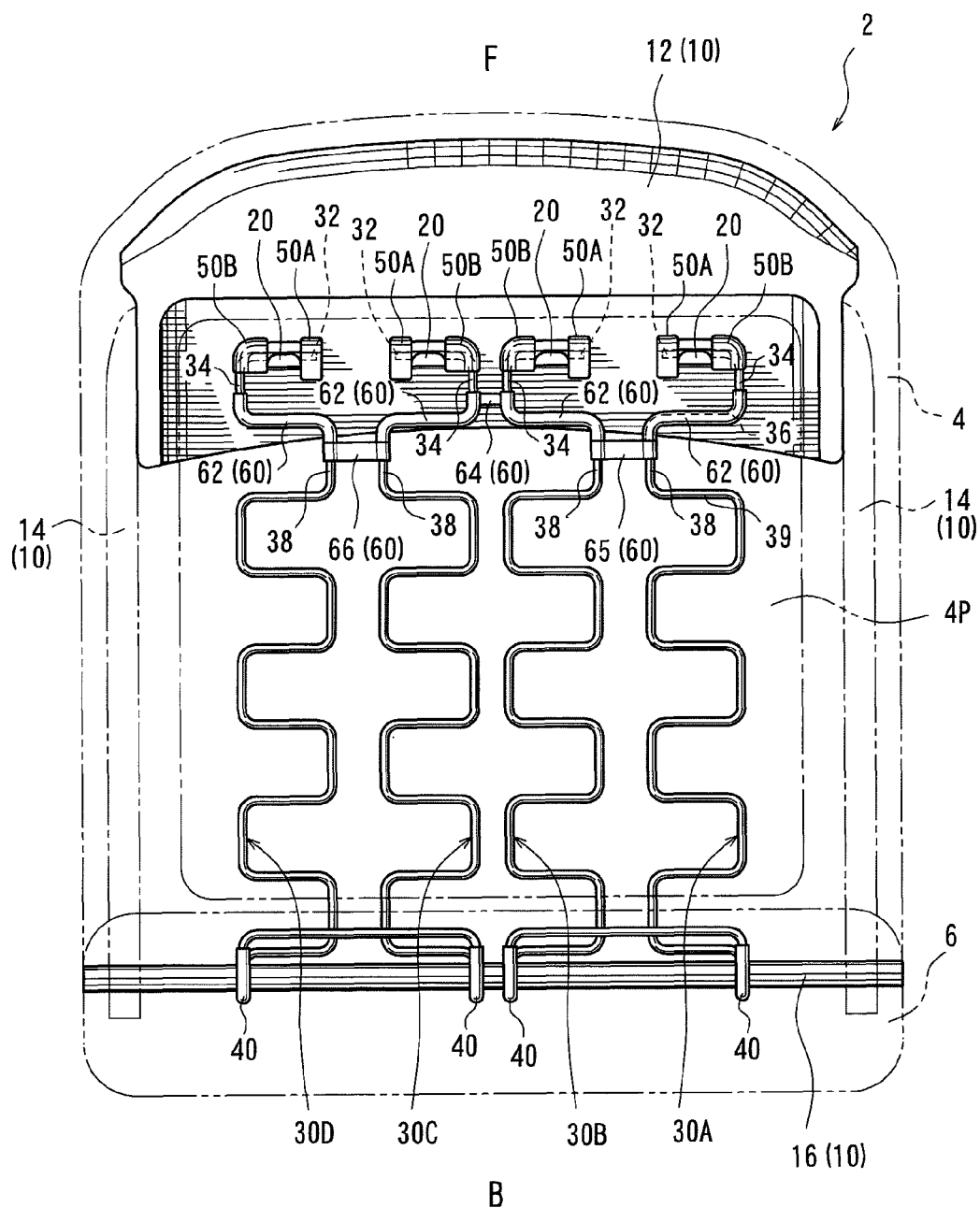
FIG. 1 is an elevational view of a seat cushion frame.

A vehicle seat 2 of a first embodiment, referring to FIG. 1, includes a seat cushion 4 and a seat back 6. The seat cushion 4 is configured by stretching cushion springs 30 (a first cushion spring 30A to a fourth cushion spring 30D, to be described hereafter) over a frame 10, which forms a seat skeleton. Also, the seat cushion 4 is configured by disposing a padding member 4P on the four cushion springs.

Then, the embodiment, taking the frame 10 of the seat cushion 4 as an example, will describe a retaining structure of the cushion springs 30 (30A to 30D).

(Frame)

The frame 10 of the seat cushion 4, referring to FIG. 1, has an anterior frame 12, which configures an anterior skeleton, and a pair of lateral frames 14 and 14, which configure a lateral skeleton. Then, a pipe frame 16 is disposed in a bridging form on the pair of lateral frames 14 and 14, on a seat back side B thereof.

Figure 2:
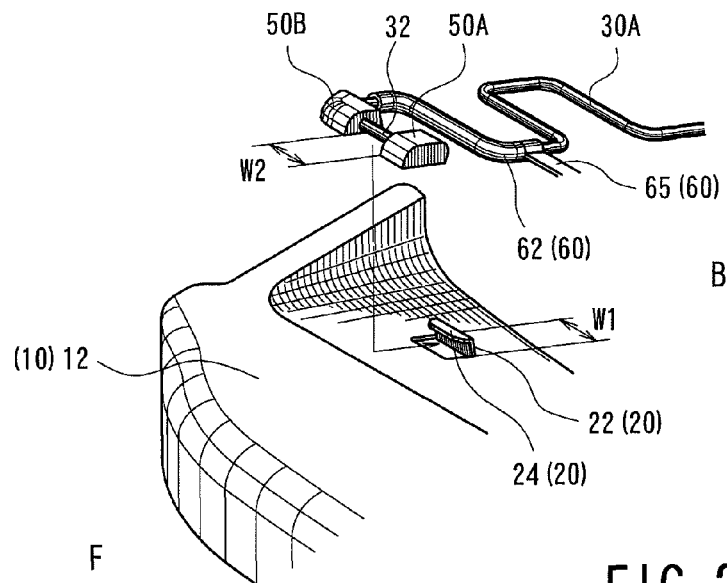
FIG. 2 is an exploded perspective view of an attachment structure.

Further, the anterior frame 12 of the embodiment can have a rectangular member horizontally long (when viewed from above), the seat back side B can be inclined in a downward direction (refer to FIG. 2). The anterior frame 12 includes claws 20, capable of retaining the cushion springs 30A to 30D, and are formed protruding on an upper surface (an inclining surface).

(Claws)

The claw 20 of the embodiment, referring to FIG. 2, forms an approximate L shape when viewed from the side. The claw 20 includes an upright portion 22 and extended portion 24. This can be formed by cutting and raising one portion, of a width dimension of W1, of the upper surface of the anterior frame 12, and the extended portion 24 formed by bending an upper side of the upright portion 22 towards a seat front side F. Then, in the embodiment, referring to FIG. 4, a projection height dimension of the claw 20 with respect to the upper surface of the anterior frame 12 (a dimension of a height from the upper surface of the anterior frame 12 to the extended portion 24) is set at T1.

Also, in this embodiment (corresponding to the number of cushion springs) claws 20 are formed at predetermined intervals in a seat width direction on the anterior frame 12.

(Cushion Springs)

This configuration is such that the cushion springs 30A to 30D are stretched over the frame 10 (a dispositional relationship of the cushion springs will be described hereafter).

Also, each cushion spring 30A to 30D configured approximately the same. For example, a first cushion spring 30A (disposed at a right extremity as seen in FIG. 1) is a wire rod of a zigzag configuration that includes section similar to an approximate reverse S shape that are joined together. One end of the first cushion spring 30A (a seat front side F extremity) is bent in the seat width direction, and is made a hook 32 which can be retained in the claw 20 (in a bridging form in the seat width direction—a left to right direction as seen in FIG. 1). A first straight portion 34, a first bent portion 36 (which bends in the same direction as the hook 32), a second straight portion 38, and a second bent portion 39 (which bends in the opposite direction to the hook 32), are formed in order connected to the hook 32 at one end of the first cushion spring 30A.

Further, the other end of the first cushion spring 30A (a seat back side B end) having a straight form, a latching attachment 40 (an approximate J shape when viewed from the side; a detailed diagram is omitted), can be latched on to the pipe frame 16.

Then, when stretching the cushion springs 30A to 30D the latching attachments 40 (on the other end) are latched onto the pipe frame 16 at a rear of the frame 10. Then, each hook 32 of the cushion springs 30A to 30D is retained, in the claws 20 of the anterior frame 12, in a bridging form in the seat width direction. On so doing, however, the claws 20 protrude farther than the cushion springs 30A to 30D in the stretched condition, and there is a danger that the padding member 4P on the cushion springs 30A to 30D will be damaged.

Therein, in this embodiment, using supporting members (50A and 50B) to be described hereafter, a configuration is such that the cushion springs 30A to 30D are retained on the frame 10 in such a way as, to reduce or eliminate damage the padding member 4P.

A retaining structure of the embodiment includes the pair of supporting members (50A and 50B), which support the padding member 4P, and a linking attachment 60, which links and integrates the cushion springs 30A to 30D.

(Pair of Supporting Members)

Each of the pair of supporting members (a first supporting member 50A and a second supporting member 50B), referring to FIG. 2, can be a resin member (typically made of a resin such as a polyethylene resin or a polypropylene resin) of an approximately semi-circular form when viewed from the side. A length dimension of the first supporting member 50A is set to be slightly larger (longer) than the second supporting member 50B.

Figure 4:
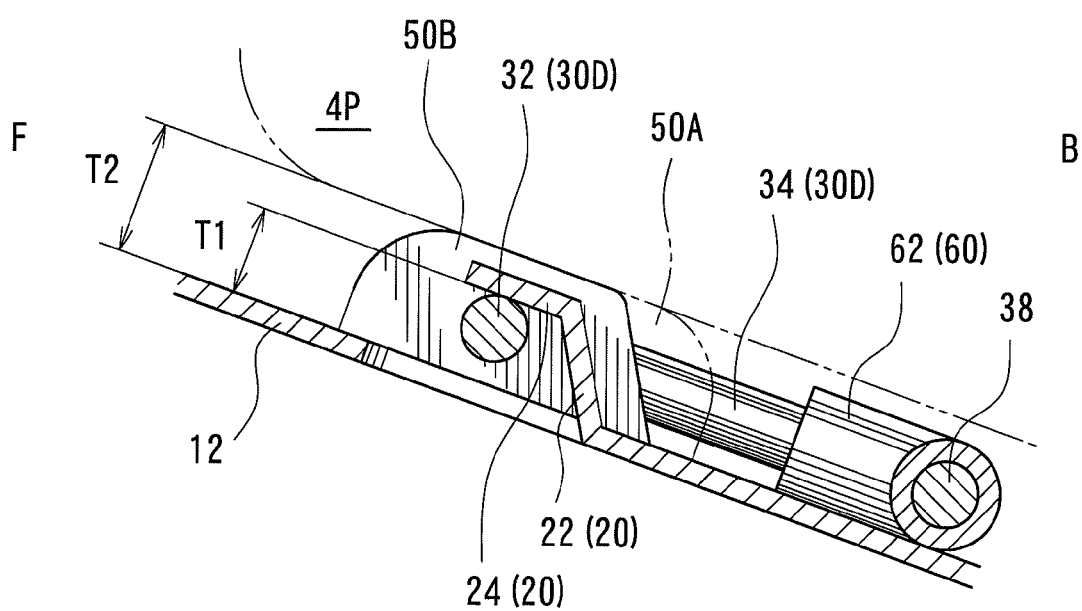
FIG. 4 is a front side perspective view of the seat cushion frame.
Figure 5:
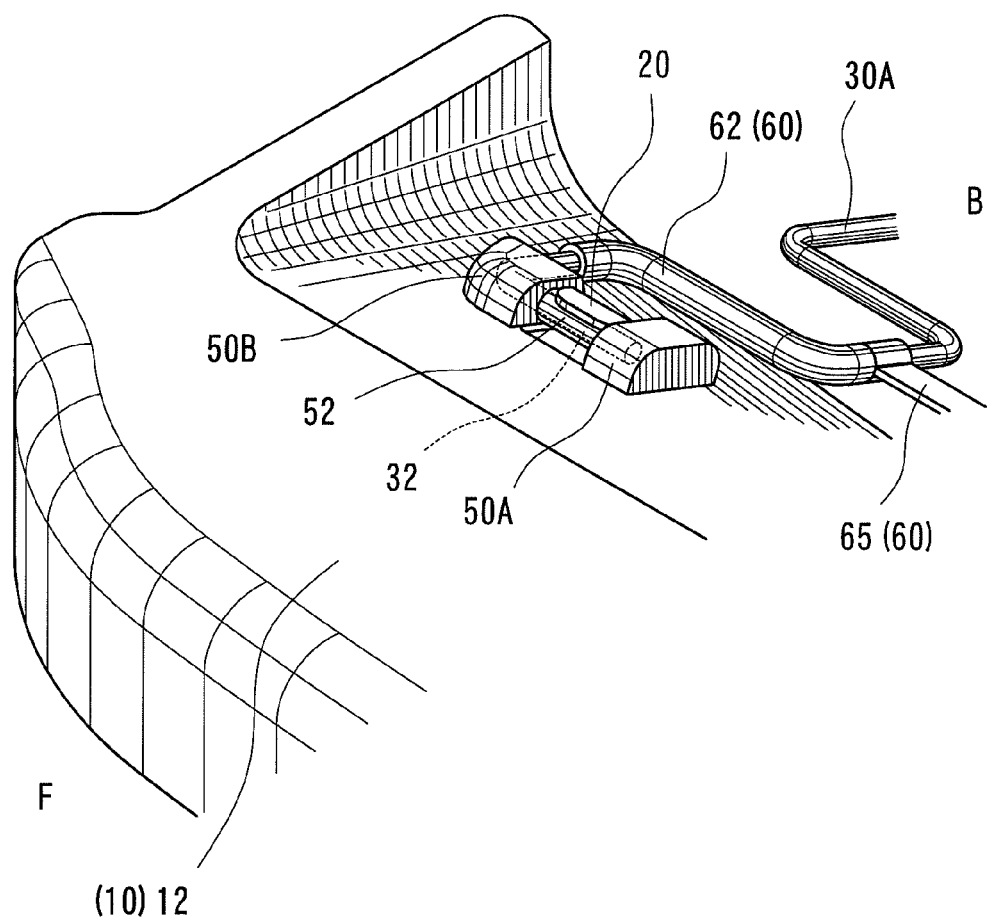
FIG. 5 is a perspective view of an attachment structure of a second embodiment.

Referring to FIG. 4, with the pair of supporting members 50A and 50B of the embodiment, a height (thickness) dimension T2 from a bottom surface to a semi-circular side apex thereof is set to be higher than the heretofore described claw 20 protrusion height dimension T1.

Figure 3:
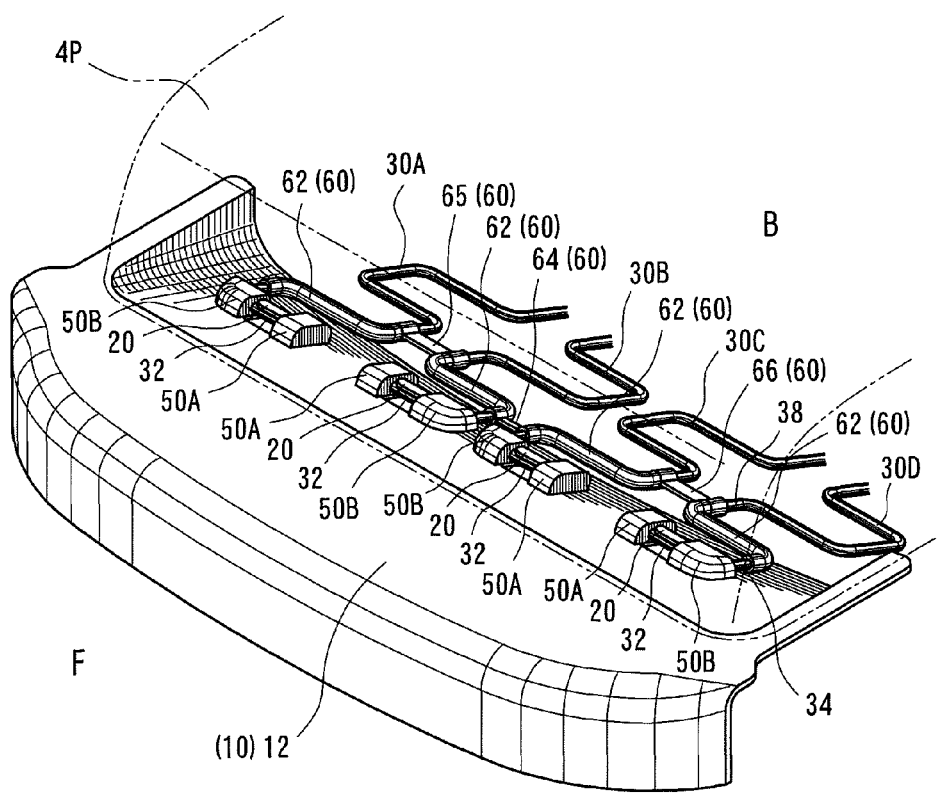
FIG. 3 is a longitudinal sectional view of the attachment structure.

Now, referring to FIG. 3, each of the pair of supporting members 50A and 50B is installed on the hook 32 in a positional disposition in which its bottom surface side faces the anterior frame 12. That is, the pairs of supporting members 50A and 50B are installed, at predetermined intervals in the seat width direction, on the hook 32 of each of the cushion springs 30A to 30D. By so doing, when installing the padding member 4P, to be described hereafter, the pairs of supporting members 50A and 50B make contact with the padding member 4P with their semi-circular shaped sides (here, a cornerless shape).

At this time, by installing the longer first supporting member 50A in a bent back form on a tip side of the hook 32, the hook 32 takes on an approximate reverse J shape when viewed head on, and it is possible to securely retain each cushion spring 30A to 30D in the claws 20.

Then, a separation dimension W2 of the pair of supporting members 50A and 50B is set to be almost identical to the claw 20 width dimension W1 (a zero gap setting). Then, at a time, to be described hereafter, of retaining the cushion springs 30A to 30D, the hook 32 exposed between the pair of supporting members 50A and 50B is caused to curve, widening a gap between the pair of supporting members 50A and 50B. Then, while widening the gap between the pair of supporting members 50A and 50B, the hook 32 is fitted into the claw 20 and retained. Then, after the retaining, the hook 32 (between the pair of supporting members 50A and 50B) takes on its original straight form, and the claw 20 is gripped by the pair of supporting members 50A and 50B disposed one on either side of the claw 20.

(Linking Attachment)

The linking attachment 60 can be a resin member which links the cushion springs 30A to 30D, maintaining a predetermined disposition condition.

Referring to FIG. 1, in the frame 10 of the embodiment, the first cushion spring 30A and the second cushion spring 30B are made into one pair, and disposed on a right side. Then, in the frame 10, the third cushion spring 30C and the fourth cushion spring 30D are made into another pair, and disposed on a left side. The one pair and the other pair are disposed in the frame 10 in such a way as to be bilaterally symmetrical when viewed from above.

The hook 32 of the first cushion spring 30A and the hook 32 of the second cushion spring 30B are positioned into a mutually facing form, and their second straight portions 38 are disposed in close proximity to each other. Also, a configuration is such that the hook 32 of the third cushion spring 30C and the hook 32 of the fourth cushion spring 30D are positioned into a mutually facing form, and their second straight portions 38 are disposed in close proximity to each other.

Then, in an interior of the frame 10, the hooks 32 of the second cushion spring 30B and the third cushion spring 30C are positioned adjacent to each other, their hooks 32 face in directions opposite to each other. Then, a configuration is such that the first straight portion 34 of the second cushion spring 30B and the first straight portion 34 of the third cushion spring 30C are disposed in close proximity to each other.

The linking attachment 60, referring to FIGS. 1 and 3, includes a cover 62, which covers the first bent portion 36 of the cushion springs 30A to 30D, and linking portions (a first linking portion 64, a second linking portion 65, and a third linking portion 66), which link the cushion springs 30A to 30D. The linking attachment 60 of the embodiment is configured as an integrated molded article in which the cover 62 and the linking portions (64, 65 and 66) are joined together.

The first linking portion 64 is a segment which links the first straight portion 34 of the second cushion spring 30B and the first straight portion 34 of the third cushion spring 30C (segments of both springs which are in close proximity) in a bridging form.

Also, the second linking portion 65 is a segment which links the second straight portion 38 of the first cushion spring 30A and the second straight portion 38 of the second cushion spring 30B (segments of both springs which are in close proximity) in a bridging form.

Then, the third linking portion 66 is a segment which links the second straight portion 38 of the third cushion spring 30C and the second straight portion 38 of the fourth cushion spring 30D (segments of both springs which are in close proximity) in a bridging form.

In this way, the cushion springs 30A to 30D are integrally linked by the linking portions (64, 65 and 66), maintaining the disposition condition. By so doing, it is possible to simultaneously carry out retaining operations, to be described hereafter, for the cushion springs 30A to 30D.

However, referring to FIG. 1, in the case of disposing the cushion springs 30A to 30D on the frame 10 in the heretofore described disposition, one portion thereof (primarily the hook 32, the first straight portion 34, and the first bent portion 36, on the one extremity side) are disposed in such a way as to ride up on the anterior frame 12. With this kind of configuration, every time a passenger sits on the seat cushion 4, the one portion of each of the cushion springs 30A to 30D comes into contact with the anterior frame 12, and a strange noise (for example, a metallic noise) is emitted, and there is a danger of making the passenger feel uncomfortable.

Therein, in the embodiment, in order to avoid the heretofore described inconvenience, a configuration is such that the one portion of each of the cushion springs 30A to 30D is supported by a resin member. Specifically, the hook 32 is supported by the supporting members (50A and 50B). Also, the first bent portion 36 joined to the first straight portion 34 is supported by covering it with the linking attachment 60 (the cover 62). By arranging in such a way that one portion of each of the cushion springs 30A to 30D does not come into direct contact with the anterior frame 12, using the resin members in this way, an inconvenience such as an emission of a strange noise due to the contact between the two members is avoided as far as possible.

(Retaining Structure)

Then, referring to FIG. 1, the cushion springs 30A to 30D linked by the linking attachment 60 are latched onto the pipe frame 16, from a seat up-down direction, using the latching attachment 40 provided at the other end of each of them. Then, retaining the hook 32 of each of the cushion springs 30A to 30D in the claws 20 (in a bridging form in the seat width direction—the left to right direction), the cushion springs 30A to 30D are stretched over the frame 10.

Then, referring to FIG. 4, the padding member 4P of the seat front side F (one side of the vehicle seat) is supported by the pair of supporting members 50A and 50B disposed one on either side of the claw 20. In this way, the padding member 4P is supported by the pair of supporting members 50A and 50B of the dimension T2, which is higher than the protrusion dimension T1 of the claw 20. By so doing, it is possible to retain the cushion springs 30A to 30D in the frame 10 without, as far as possible, allowing the claw 20 to come into contact with the padding member 4P.

In this way, according to the embodiment, by means of a simple configuration which merely installs the pair of supporting members 50A and 50B, it is possible to retain the cushion springs 30A to 30D in the frame 10 in such a way as, to reduce or eliminate damage the padding member 4P.

Second Embodiment

As a basic structure of a second embodiment is almost identical to that of the first embodiment, a detailed description of a common structures and the like will be omitted by using the same reference numerals or letters.

In a retaining structure of the second embodiment, the hook 32 exposed between the pair of supporting members 50A and 50B is of a configuration wherein it is covered with a resin covering member 52. Then, the covering member 52 is provided in a bridging form on the pair of supporting members 50A and 50B. The covering member 52 and the pair of supporting members 50A and 50B are typically configured as an integrated molded article.

According to this embodiment, a whole of the hook 32 exposed between the pair of supporting members 50A and 50B is covered by the covering member 52. By so doing, it is made difficult for the cushion springs 30A to 30D (the hooks 32), when in the retained condition, and the claws 20 to come into direct contact. For this reason, it is possible to prevent or reduce an emission of a strange noise caused by the contact between the hooks 32 and the claws 20.

Alternative Embodiments

The cushion spring retaining structure of the embodiment is not limited to the previously described embodiments, and therefore it is possible to adopt various other embodiments.

(1) Although the claw 20 is described as having an approximate L shape when viewed side on, it is also acceptable that the claw 20 can be of any kind of shape, as long as it can retain the hook 32. The claw can adopt various kinds of shape such as, for example, a horizontal U shape, a Z shape, a C shape, or an E shape, when viewed side on. Also, it also acceptable that the claw is of a simple configuration wherein a rod member or a plate member is erected on the frame 10.

The claw 20 is also described as being configured by cutting and raising one portion of the upper surface of the anterior frame 12 (an example reducing a number of parts). Differing from this, it is also acceptable to use a claw which is a member separate from the anterior frame 12.

(2) As previously described, the supporting members (50A and 50B) can have an approximately semi-circular shape when viewed from the side. It is also acceptable that the supporting members (50A and 50B) are of any kind of shape, as long as they can support the padding member 4P without, as far as possible, reducing or eliminating damage it. Preferably, the shape of the supporting members (50A and 50B) is a cornerless shape, like a semi-circular shape, a semi-elliptical shape, an elliptical shape or a circular shape, when viewed side on, or a multiangular shape in which corners are rounded, such as a radiused triangle or a radiused quadrilateral.

(3) As previously described, the height (thickness) dimension T2 of the pair of supporting members 50A and 50B is set to be higher than the claw 20 protrusion height dimension Ti. Differing from this, it is also acceptable to set the height (thickness) dimension T2 of the pair of supporting members 50A and 50B and the claw 20 protrusion height dimension T1 to be identical. With this configuration too, by means of the pair of supporting members 50A and 50B supporting the padding member 4P along with the claw 20, it is possible to avoid, as far as possible, the protrusion of the claw 20 on the padding member 4P side.

(4) As previously described, the four cushion springs 30A to 30D are stretched on. It is also acceptable to have one or a plurality of cushion springs, and this can be changed appropriately in accordance with a cushioning performance of the frame 10.

As previously described, a separate body has been used for each of the cushion springs 30A to 30D. Differing from this, it is also acceptable that the cushion spring is configured by, after bending a single wire rod into, for example, an approximate U shape, making each free end into a zigzag shape. Also, in the embodiment, a description has been given of the example wherein one portion of the cushion spring is made the hook 32, but it is also acceptable to use a hook of a separate member differing from the cushion spring.

(5) Also, in the second embodiment, it was described that the hook 32, being exposed between the pair of supporting members 50A and 50B, be covered with the resin covering member. Differing from this, it is also acceptable to adopt a configuration wherein a tubular covering member covering only one portion of the hook 32 between the pair of supporting members 50A and 50B is fitted on.

(6) Further, the present invention can be suitably employed in a frame in which it is necessary to retain a cushion spring. For example, when attaching a cushion spring to a frame of the seat back 6 too, it is possible to employ the retaining structure of the embodiment.

This invention claims:

1. A vehicle seat comprising:
a frame;
a padding member on a cushion spring;
a hook at a first end of the cushion spring;
a claw protruding from an upper surface of a first side of the frame, and a second end of the cushion spring extending to a second side of the frame, wherein the hook is retained in the claw; and
a pair of resin supporting members for supporting the padding member provided at the claw and positioned on both sides of the claw, wherein a top-most portion of each of the pair of supporting members at the claw is equal to or extends above a top-most portion of the claw to prevent the claw from contacting the padding member.

2. The vehicle seat according to claim 1, wherein a portion of the hook is covered with a resin covering member.

3. The vehicle seat according to claim 1, wherein the pair of supporting members are on the hook at an interval dimension to allow grip of the claw, and the cushion spring is retained in the claw by the pair of supporting members.

4. The vehicle seat according to claim 2, wherein the pair of supporting members are on the hook at an interval dimension whereby they can grip the claw, and the cushion spring is retained in the claw by the pair of supporting members.

5. The vehicle seat according to claim 1, wherein the hook and the pair of supporting members are separate structures.

6. A seat comprising:
a frame including a claw member;
a spring member having a first end and a second end both connected to the frame, wherein
the first end of the spring member is retainable in the claw member, and further wherein
the first end of the spring member includes a first support member and a second support member positioned at the claw member on both sides of the claw member, each of the first and second support members having a top-most portion at the claw member that is equal to or extends above a top-most portion of the claw member.

7. The seat according to claim 6, wherein the first support member has a length longer than the second support member.

8. The seat according to claim 6, wherein the first and second support members are made of a resin material.

9. The seat according to claim 6, wherein the spring member is a plurality of springs, and wherein the plurality of springs are connected by a linking portion member.

10. The seat according to claim 6, wherein the first end of the spring member includes a covering member positioned between the claw member and the first end of the spring member.

11. The seat according to claim 6, wherein the first end of the spring member and the first and second support members are separate structures.

* * * * *